(12) United States Patent
Ayyapureddi

(10) Patent No.: US 11,841,765 B2
(45) Date of Patent: Dec. 12, 2023

(54) SCRUB OPERATIONS WITH ROW ERROR INFORMATION

(71) Applicant: Micron Technology, Inc., Boise, ID (US)

(72) Inventor: Sujeet V. Ayyapureddi, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 17/657,575

(22) Filed: Mar. 31, 2022

(65) Prior Publication Data
US 2023/0315568 A1  Oct. 5, 2023

(51) Int. Cl.
*G06F 11/00* (2006.01)
*G06F 11/10* (2006.01)

(52) U.S. Cl.
CPC .................................. *G06F 11/106* (2013.01)

(58) Field of Classification Search
CPC .. G06F 11/106; G06F 11/076; G06F 11/0766; G06F 11/2053
See application file for complete search history.

(56) References Cited

U.S. PATENT DOCUMENTS

| | | | | |
|---|---|---|---|---|
| 2009/0132876 | A1* | 5/2009 | Freking | G11C 29/76 714/723 |
| 2017/0192843 | A1* | 7/2017 | Warnes | G11C 29/06 |
| 2019/0073261 | A1* | 3/2019 | Halbert | G06F 3/0679 |
| 2021/0141691 | A1* | 5/2021 | Song | G06F 11/1068 |
| 2022/0208293 | A1* | 6/2022 | Kim | G11C 29/4401 |

* cited by examiner

*Primary Examiner* — Joseph D Manoskey
(74) *Attorney, Agent, or Firm* — Holland & Hart LLP

(57) ABSTRACT

Methods, systems, and devices for scrub operations with row error information are described. A memory device may include a memory array with a set of rows. During a scrub operation, the memory device may read data and error control information stored in a row of the memory array and detect a quantity of errors in the row. The memory device may store the quantity of detected errors in the row of the memory device during the scrub operation in memory cells of the memory array storing data associated with the row of the memory array. In some cases, the memory device may then determine that the row is associated with a decreased reliability based on the stored quantity of errors detected in the row during the scrub operation. Here, the memory device may reconfigure the memory array to store the data of the row in another row.

22 Claims, 6 Drawing Sheets

400

SCRUB OPERATIONS WITH ROW ERROR INFORMATION

FIELD OF TECHNOLOGY

The following relates to one or more systems for memory, including scrub operations with row error information.

BACKGROUND

Memory devices are widely used to store information in various electronic devices such as computers, user devices, wireless communication devices, cameras, digital displays, and the like. Information is stored by programming memory cells within a memory device to various states. For example, binary memory cells may be programmed to one of two supported states, often denoted by a logic 1 or a logic 0. In some examples, a single memory cell may support more than two states, any one of which may be stored. To access the stored information, a component may read (e.g., sense, detect, retrieve, identify, determine, evaluate) a stored state in the memory device. To store information, a component may write (e.g., program, set, assign) the state in the memory device.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), self-selecting memory, chalcogenide memory technologies, not-or (NOR) and not-and (NAND) memory devices, and others. Memory cells may be described in terms of volatile configurations or non-volatile configurations. Memory cells configured in a non-volatile configuration may maintain stored logic states for extended periods of time even in the absence of an external power source. Memory cells configured in a volatile configuration may lose stored states when disconnected from an external power source.

DETAILED DESCRIPTION

Figure 1:
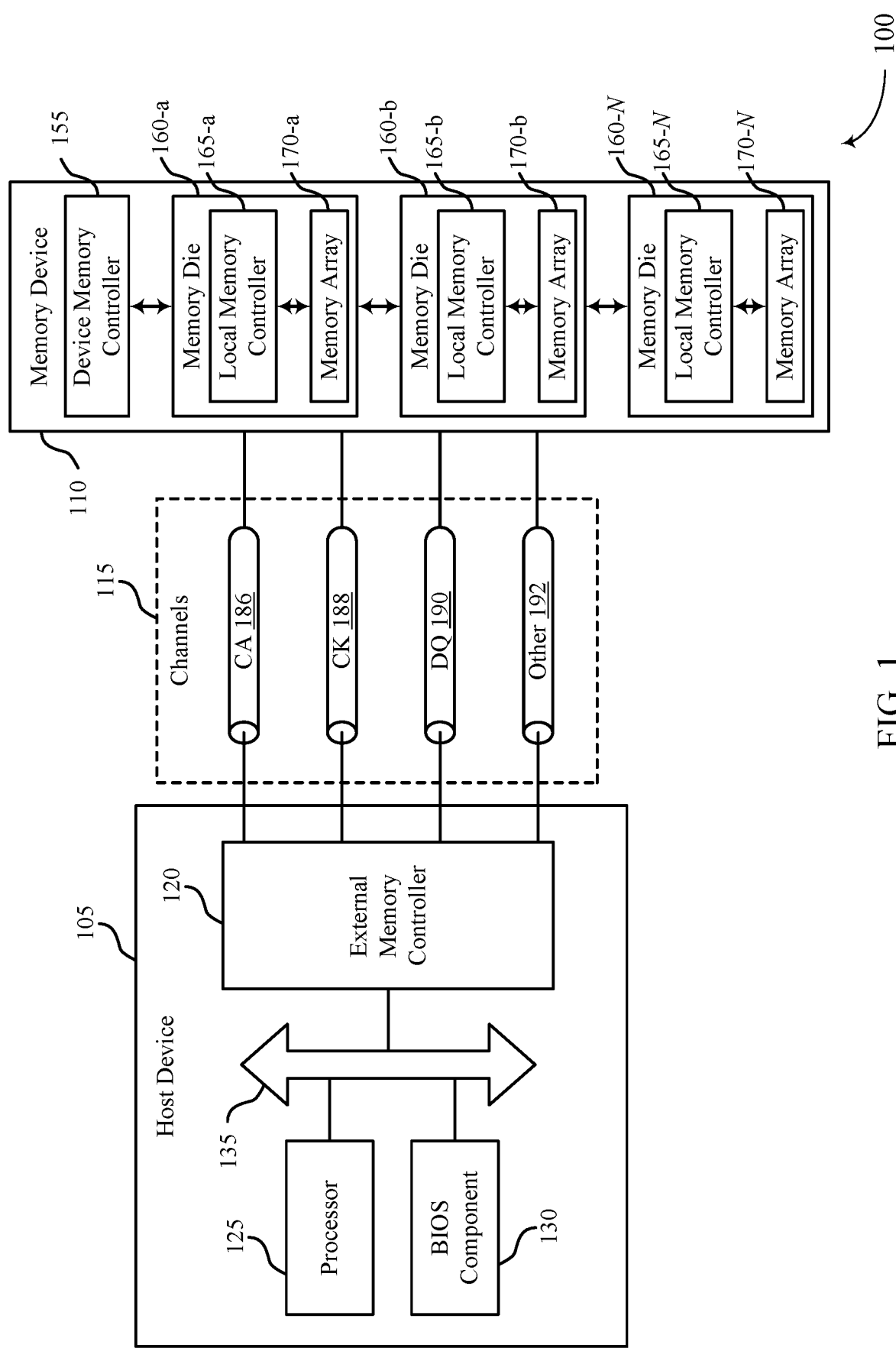
FIG. 1 illustrates an example of a system that supports scrub operations with row error information in accordance with examples as disclosed herein.

A memory device may store data and error control information associated with the data at a memory array. Additionally, the memory device may be configured to scrub the memory array to detect or correct errors within data stored at the memory array. To perform a scrub operation, the memory device may generate internal commands to scrub each row of the memory array. Alternatively, the memory device may receive one or more scrub commands from a host device indicating for the memory device to perform the scrub operation. The scrub operation may include the memory device reading data and the error control information, performing the error control operation on the data (e.g., to detect errors within the data or to generate corrected data), and, in some cases, writing corrected data back to the memory array. A single scrub operation may correspond to the memory device scrubbing each of the rows of the memory array. Some memory devices may store an indication of a total quantity of errors detected in the memory array during a previously-executed scrub operation. Additionally, the memory device may store an indication of the row of the memory array associated with more detected errors than other rows of the memory array.

In some instances, however, the memory device may be unable to identify one or more rows of a memory array associated with decreased reliability based on the stored total quantity of errors detected in the previously-executed scrub operation and the row of the memory array associated with more detected errors than other rows of the memory array. For example, the memory device may be unable to identify rows associated with persistently large quantities of errors detected during scrub operations.

Systems, techniques, and devices are described herein for storing the quantity of errors detected in each row of a memory array during a scrub operation. That is, the memory device may store, in memory cells configured to store information associated with a corresponding row of the memory array (e.g., row metadata), the quantity of errors detected in a most recently-executed scrub operation. Additionally, the memory device may store the quantity of errors detected in one or more additional previously-executed scrub operations. For example, the memory device may store the quantity of errors detected in each row during two or more previously-executed scrub operations. Thus, the memory device may determine whether a row of a memory array is associated with a decreased reliability based on the stored quantities of errors detected in the row during the two or more previously-executed scrub operations. In cases that the memory device determines that a row of the memory array is associated with a decreased reliability, the memory device may reconfigure the memory array to store the data of the row in another row that is not associated with the decreased reliability (e.g., by offlining the row associated with the decreased reliability). Here, reconfiguring the memory array based on identifying a row of the memory array associated with the decreased reliability may improve the reliability of the memory device.

Features of the disclosure are initially described in the context of systems and dies as described with reference to FIGS. 1 and 2. Features of the disclosure are described in the context a system and a process flow as described with reference to FIGS. 3 and 4. These and other features of the disclosure are further illustrated by and described with reference to an apparatus diagram and flowcharts that relate to scrub operations with row error information as described with reference to FIGS. 5 and 6.

FIG. 1 illustrates an example of a system 100 that supports scrub operations with row error information in accordance with examples as disclosed herein. The system 100 may include a host device 105, a memory device 110, and a plurality of channels 115 coupling the host device 105 with the memory device 110. The system 100 may include one or more memory devices 110, but aspects of the one or more memory devices 110 may be described in the context of a single memory device (e.g., memory device 110).

Portions of the system 100 may be examples of the host device 105. The host device 105 may be an example of a processor (e.g., circuitry, processing circuitry, a processing component) within a device that uses memory to execute processes. In some examples, the host device 105 may refer to the hardware, firmware, software, or a combination thereof that implements the functions of an external memory controller 120. In some examples, the external memory controller 120 may be referred to as a host (e.g., host device 105).

A memory device 110 may be an independent device or a component that is operable to provide physical memory addresses/space that may be used or referenced by the system 100. The memory device 110 may be operable to store data for the components of the host device 105. In some examples, the memory device 110 (e.g., operating as a secondary-type device to the host device 105, operating as a dependent-type to the host device 105) may respond to and execute commands provided by the host device 105 through the external memory controller 120. Such commands may include one or more of a write command for a write operation, a read command for a read operation, a refresh command for a refresh operation, a scrub command for a scrub operation, or other commands.

The host device 105 may include one or more of an external memory controller 120, a processor 125, a basic input/output system (BIOS) component 130, or other components such as one or more peripheral components or one or more input/output controllers. The components of the host device 105 may be coupled with one another using a bus 135. The processor 125 may be operable to provide functionality (e.g., control functionality) for the system 100 or the host device 105. The BIOS component 130 may be a software component that includes a BIOS operated as firmware, which may initialize and run various hardware components of the system 100 or the host device 105.

The memory device 110 may include a device memory controller 155 and one or more memory dies 160 (e.g., memory chips) to support a capacity (e.g., a desired capacity, a specified capacity) for data storage. Each memory die 160 (e.g., memory die 160-a, memory die 160-b, memory die 160-N) may include a local memory controller 165 (e.g., local memory controller 165-a, local memory controller 165-b, local memory controller 165-N) and a memory array 170 (e.g., memory array 170-a, memory array 170-b, memory array 170-N).

A memory array 170 may be a collection (e.g., one or more grids, one or more banks, one or more tiles, one or more sections) of memory cells, with each memory cell being operable to store one or more bits of data. For example, each memory array 170 may include a set of rows, where each row may store multiple sets of data (e.g., codewords) associated with a corresponding bank. In some cases, each row may additionally store error control information associated with the data stored in that row. That is, the row of the memory array 170 may store error control information associated with each codeword in a row. Additionally, or alternatively, the row of the memory array 170 may store a single set of error control information associated with each of the codewords in the row. The memory array 170 may additionally include a set of memory cells configured to store row metadata (e.g., data associated with each of the rows of the memory array 170).

The device memory controller 155 may include components (e.g., circuitry, logic) operable to control operation of the memory device 110. The device memory controller 155 may include the hardware, the firmware, or the instructions that enable the memory device 110 to perform various operations and may be operable to receive, transmit, or execute commands, data, or control information related to the components of the memory device 110. The device memory controller 155 may be operable to communicate with one or more of the external memory controller 120, the one or more memory dies 160, or the processor 125. In some examples, the device memory controller 155 may control operation of the memory device 110 described herein in conjunction with the local memory controller 165 of the memory die 160.

A local memory controller 165 (e.g., local to a memory die 160) may include components (e.g., circuitry, logic) operable to control operation of the memory die 160. In some examples, a local memory controller 165 may be operable to communicate (e.g., receive or transmit data or commands or both) with the device memory controller 155. In some examples, a memory device 110 may not include a device memory controller 155, and a local memory controller 165 or the external memory controller 120 may perform various functions described herein. As such, a local memory controller 165 may be operable to communicate with the device memory controller 155, with other local memory controllers 165, or directly with the external memory controller 120, or the processor 125, or a combination thereof.

The external memory controller 120 may be operable to enable communication of information (e.g., data, commands, or both) between components of the system 100 (e.g., between components of the host device 105, such as the processor 125, and the memory device 110). The external memory controller 120 may process (e.g., convert, translate) communications exchanged between the components of the host device 105 and the memory device 110.

The components of the host device 105 may exchange information with the memory device 110 using one or more channels 115. The channels 115 may be operable to support communications between the external memory controller 120 and the memory device 110. Each channel 115 may include one or more signal paths (e.g., a transmission medium, a conductor) between terminals associated with the components of the system 100. A signal path may be an example of a conductive path operable to carry a signal. Channels 115 (and associated signal paths and terminals) may be dedicated to communicating one or more types of information. For example, the channels 115 may include one or more command and address (CA) channels 186, one or more clock signal (CK) channels 188, one or more data (DQ) channels 190, one or more other channels 192, or a combination thereof.

Some memory devices 110 may be configured to internally detect and in some cases correct (e.g., repair) errors and thereby recover the data as stored before the data becomes corrupted (e.g., uncorrectable errors are in the data). Such error detection and correction may rely upon error control information including one or more error-correcting codes (ECCs) (e.g., block codes, convolutional codes, Hamming codes, low-density parity-check codes, turbo codes, polar codes), and related processes, operations, and techniques may be referred as error control processes, ECC processes, ECC operations, ECC techniques, or in some cases as simply ECC. Error control operations conducted internally within the memory device 110 on data stored previously at the memory device 110 may generally be referred to as internal or on-die error control (whether within a single-die memory device or a multi-die memory device). For example, in-line error control may refer to embedded error control information (e.g., by a host device 105) within data stored in the memory device 110 that is checked (e.g., or corrected) by the host device 105. That is, for in-line error control, the memory device 110 may be unaware of the error control information and may treat both data and error control information as data. In another example, extra error control information bits may accompany data in a DQ channel 190 for read or write operations, and may be used to detect or correct errors that occur in transmission of data between the memory device 110 and the host device 105. This type of error control may be known as link error control.

During the execution of a write command, a memory device with error control information may perform an error correction operation on data to be stored at a memory array 170 (e.g., received from a host device) to generate error control information corresponding to the data. The memory device 110 may store the data and the error control information at the memory array 170 as part of the write operation.

The memory device 110 may be configured to scrub the memory arrays 170 to detect or correct errors within data stored at the memory arrays 170. To perform a scrub operation, the memory device 110 (e.g., the device memory controller 155, a local memory controller 165) may generate internal commands to scrub each row of the memory array 170. Alternatively, the memory device 110 may receive one or more scrub commands from the host device 105 indicating for the memory device 110 to perform the scrub operation. The scrub operation may include the memory device 110 reading the data and the error control information (e.g., stored in a memory array 170 during a write operation), performing the error control operation on the data (e.g., to detect errors within the data, to generate corrected data), and, in some cases, writing corrected data back to the memory array 170. A single scrub operation may correspond to the memory device 110 scrubbing each of the rows of the memory array 170. Some memory devices 110 may store an indication of a total quantity of errors detected in the memory array 170 during a previously-executed scrub operation. Additionally, the memory device 110 may store an indication of the row of the memory array associated with more detected errors than other rows of the memory array.

In some instances, however, the memory device 110 may store the quantity of errors detected in each row of a memory array 170 during a scrub operation. That is, the memory device 110 may store, in the memory cells of the memory array 170 configured to store the information associated with a corresponding row of the memory array (e.g., row metadata), the quantity of errors detected in a most recently-executed scrub operation. Additionally, the memory device 110 may store the quantity of errors detected in one or more additional previously-executed scrub operations. For example, the memory device 110 may store the quantity of errors detected in each row during two or more previously-executed scrub operations. Thus, the memory device 110 may determine whether a row of a memory array 170 is associated with a decreased reliability based on the stored quantities of errors detected in the row during the two or more previously-executed scrub operations. In cases that the memory device 110 determines that a row of the memory array 170 is associated with a decreased reliability, the memory device 110 may reconfigure the memory array 170 to store the data of the row in another row that is not associated with the decreased reliability (e.g., by offlining the row associated with the decreased reliability). Here, reconfiguring the memory array 170 based on identifying a row of the memory array 170 associated with the decreased reliability may improve the reliability of the memory device 110.

Figure 2:
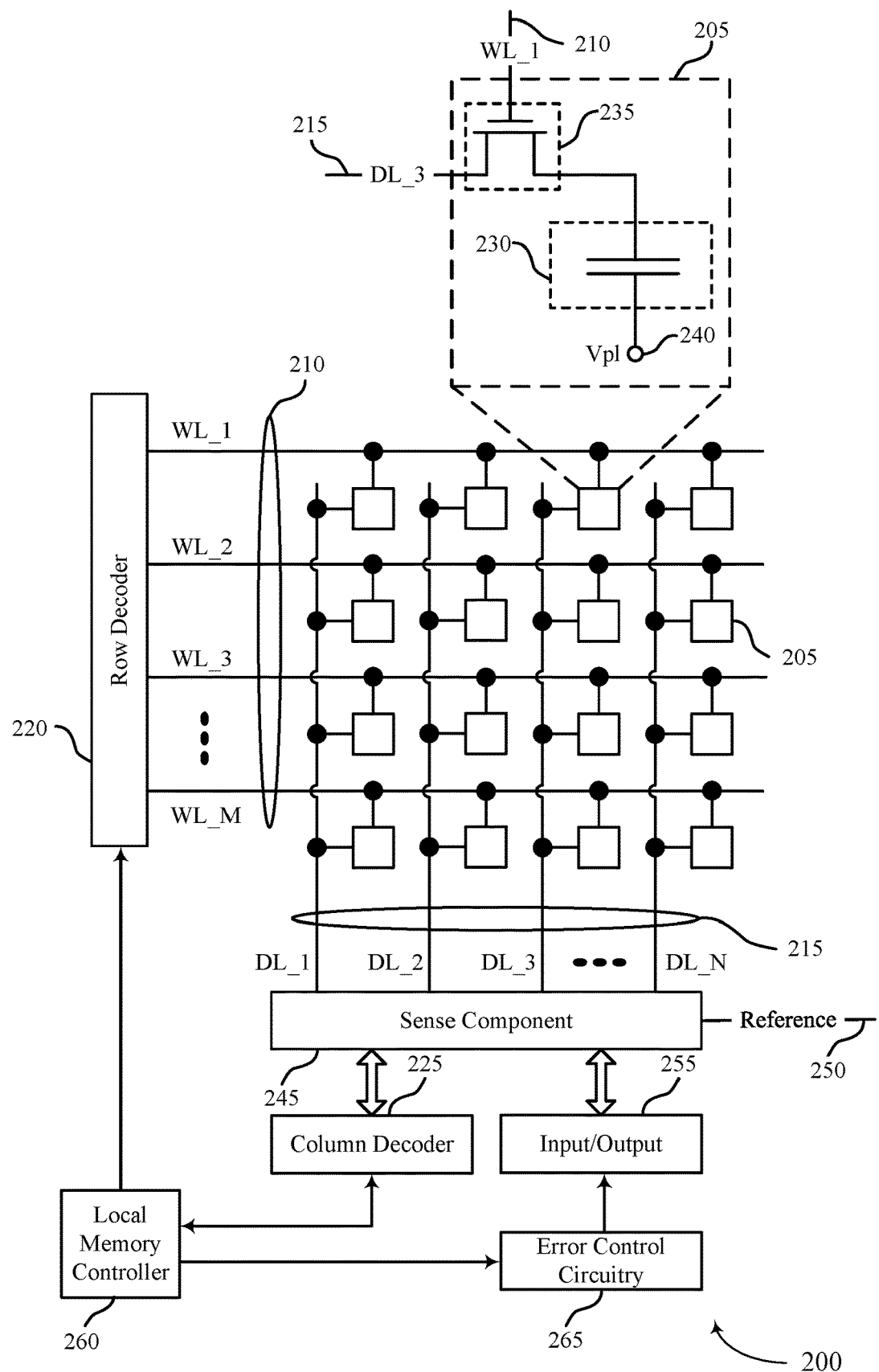
FIG. 2 illustrates an example of a memory die that supports scrub operations with row error information in accordance with examples as disclosed herein.

FIG. 2 illustrates an example of a memory die 200 that supports scrub operations with row error information in accordance with examples as disclosed herein. The memory die 200 may be an example of the memory dies 160 described with reference to FIG. 1. In some examples, the memory die 200 may be referred to as a memory chip, a memory device, or an electronic memory apparatus. The memory die 200 may include one or more memory cells 205 that may be programmable to store different logic states (e.g., programmed to one of a set of two or more possible states). In some examples, the memory cells 205 may be arranged in an array, such as a memory array 170 described with reference to FIG. 1.

In some examples, a memory cell 205 may store a charge representative of the programmable states in a capacitor. In some other examples, the memory cell 205 may include a logic storage component, such as capacitor 230, and a switching component 235 (e.g., a cell selection component). A node of the capacitor 230 may be coupled with a voltage source 240.

The memory die 200 may include access lines (e.g., word lines 210 and digit lines 215) arranged in a pattern, such as a grid-like pattern. Memory cells 205 may be positioned at intersections of the word lines 210 and the digit lines 215. Operations such as reading and writing may be performed on the memory cells 205 by activating access lines such as a word line 210 or a digit line 215. By biasing a word line 210 and a digit line 215 (e.g., applying a voltage to the word line 210 or the digit line 215), a single memory cell 205 may be accessed at their intersection. The intersection of a word line 210 and a digit line 215 in a two-dimensional or in a three-dimensional configuration may be referred to as an address of a memory cell 205. Activating a word line 210 or a digit line 215 may include applying a voltage to the respective line.

Accessing the memory cells 205 may be controlled through a row decoder 220, or a column decoder 225, or a combination thereof. For example, a row decoder 220 may receive a row address from the local memory controller 260 and activate a word line 210 based on the received row address. A column decoder 225 may receive a column address from the local memory controller 260 and may activate a digit line 215 based on the received column address. Selecting or deselecting the memory cell 205 may be accomplished by activating or deactivating the switching component 235 using a word line 210. The capacitor 230 may be coupled with the digit line 215 using the switching component 235.

The sense component 245 may be operable to detect a state (e.g., a charge) stored on the capacitor 230 of the memory cell 205 and determine a logic state of the memory cell 205 based on the stored state. The detected logic state of the memory cell 205 may be provided as an output of the sense component 245 (e.g., to an input/output 255), and may indicate the detected logic state to another component of a memory device (e.g., a memory device 110) that includes the memory die 200.

The local memory controller 260 may control the accessing of memory cells 205 through the various components (e.g., row decoder 220, column decoder 225, sense component 245). The local memory controller 260 may be an example of the local memory controller 165 described with reference to FIG. 1. In some examples, one or more of the row decoder 220, column decoder 225, and sense component 245 may be co-located with the local memory controller 260. The local memory controller 260 may be operable to receive one or more of commands or data from one or more different memory controllers (e.g., an external memory controller 120 associated with a host device 105, another controller associated with the memory die 200), translate the commands or the data (or both) into information that can be used by the memory die 200, perform one or more operations on the memory die 200, and communicate data from the memory die 200 to a host (e.g., a host device 105) based on performing the one or more operations. The local memory controller 260 may generate row signals and column address signals to activate the target word line 210 and the target digit line 215. The local memory controller 260 also may generate and control various signals (e.g., voltages, currents) used during the operation of the memory die 200.

The local memory controller 260 may be operable to perform one or more access operations on one or more memory cells 205 of the memory die 200. In some examples, access operations may be performed by or otherwise coordinated by the local memory controller 260 in response to various access commands (e.g., from a host device 105). T The local memory controller 260 may be operable to perform a write operation (e.g., a programming operation) on one or more memory cells 205 of the memory die 200. During a write operation, a memory cell 205 of the memory die 200 may be programmed to store a desired state (e.g., logic state, charge state). The local memory controller 260 may identify a target memory cell 205 on which to perform the write operation. The local memory controller 260 may identify a target word line 210 and a target digit line 215 coupled with the target memory cell 205 (e.g., an address of the target memory cell 205). The local memory controller 260 may activate the target word line 210 and the target digit line 215 (e.g., applying a voltage to the word line 210 or digit line 215) to access the target memory cell 205. The local memory controller 260 may apply a signal (e.g., a write pulse, a write voltage) to the digit line 215 during the write operation to store a specific state (e.g., charge) in the capacitor 230 of the memory cell 205. The signal used as part of the write operation may include one or more voltage levels over a duration.

The local memory controller 260 may be operable to perform a read operation (e.g., a sense operation) on one or more memory cells 205 of the memory die 200. During a read operation, the state (e.g., logic state, charge state) stored in a memory cell 205 of the memory die 200 may be evaluated (e.g., read, determined, identified). The local memory controller 260 may identify a target memory cell 205 on which to perform the read operation. The local memory controller 260 may identify a target word line 210 and a target digit line 215 coupled with the target memory cell 205 (e.g., the address of the target memory cell 205). The local memory controller 260 may activate the target word line 210 and the target digit line 215 (e.g., applying a voltage to the word line 210 or digit line 215) to access the target memory cell 205. The target memory cell 205 may transfer a signal (e.g., charge, voltage) to the sense component 245 in response to biasing the access lines. The sense component 245 may amplify the signal. The local memory controller 260 may activate the sense component 245 (e.g., latch the sense component) and compare the signal received from the memory cell 205 to a reference (e.g., the reference 250). Based on that comparison, the sense component 245 may determine a logic state that is stored on the memory cell 205.

The error control circuitry 265 or the local memory controller 260 may perform one or more error control operations on data received from the host device as part of a write operation. For example, the error control circuitry 265 may receive data from the host device as part of a write operation. The error control circuitry 265 may determine or generate error control information associated with the data. In some cases, the error control circuitry 265 may include error detection logic or may cause error detection logic (not shown) to perform the error detection operations described herein. The error control circuitry 265 may cause the data and the error control information to be stored in one or more memory cells 205 as part of the write operation. In another example, the error control circuitry 265 may receive data and associated error control information from a memory array as part of a read operation. The error control circuitry 265 may perform an error correction operation based on the data and the error control information. Performing an error correction operation at the memory device (e.g., by the error control circuitry 265 or the local memory controller 260) may improve the reliability of the memory device.

The local memory controller 260 may be configured to scrub the memory die 200 in order to detect or correct errors at one or more of the memory cells 205. To perform a scrub operation, the local memory controller 260 may generate internal commands (and in some cases addresses indicating one or more rows of the memory die 200) to scrub each row of the memory die 200. Alternatively, the local memory controller 260 may receive one or more scrub commands from a host device (e.g., an external memory controller is discussed with reference to FIG. 1) associated with the scrub operation. The scrub operation may include the local memory controller 260 initiating a read operation to read data and error control information stored in a row of the memory die 200. Then, the error control circuitry 265 may perform an error control operation on the data based on the error control information (e.g., to detect errors within the data, to generate corrected data). The scrub operation may additionally include the local memory controller 260 storing the quantity of errors detected in the data during the error control operation (e.g., in memory cells 205 configured to store metadata associated with the row). Then, in some cases, the scrub operation may additionally include the local memory controller 260 writing the corrected data back to the memory cells of the memory die 200. A single scrub operation may correspond to the local memory controller 260 scrubbing each of the rows of the memory die 200. The scrub operation may increase the reliability of the memory die 200 by correcting bit errors before they build up to a level that may not be able to be corrected by error control circuitry 265 based on the quantity of error control bits stored with the data in each row.

Figure 3:
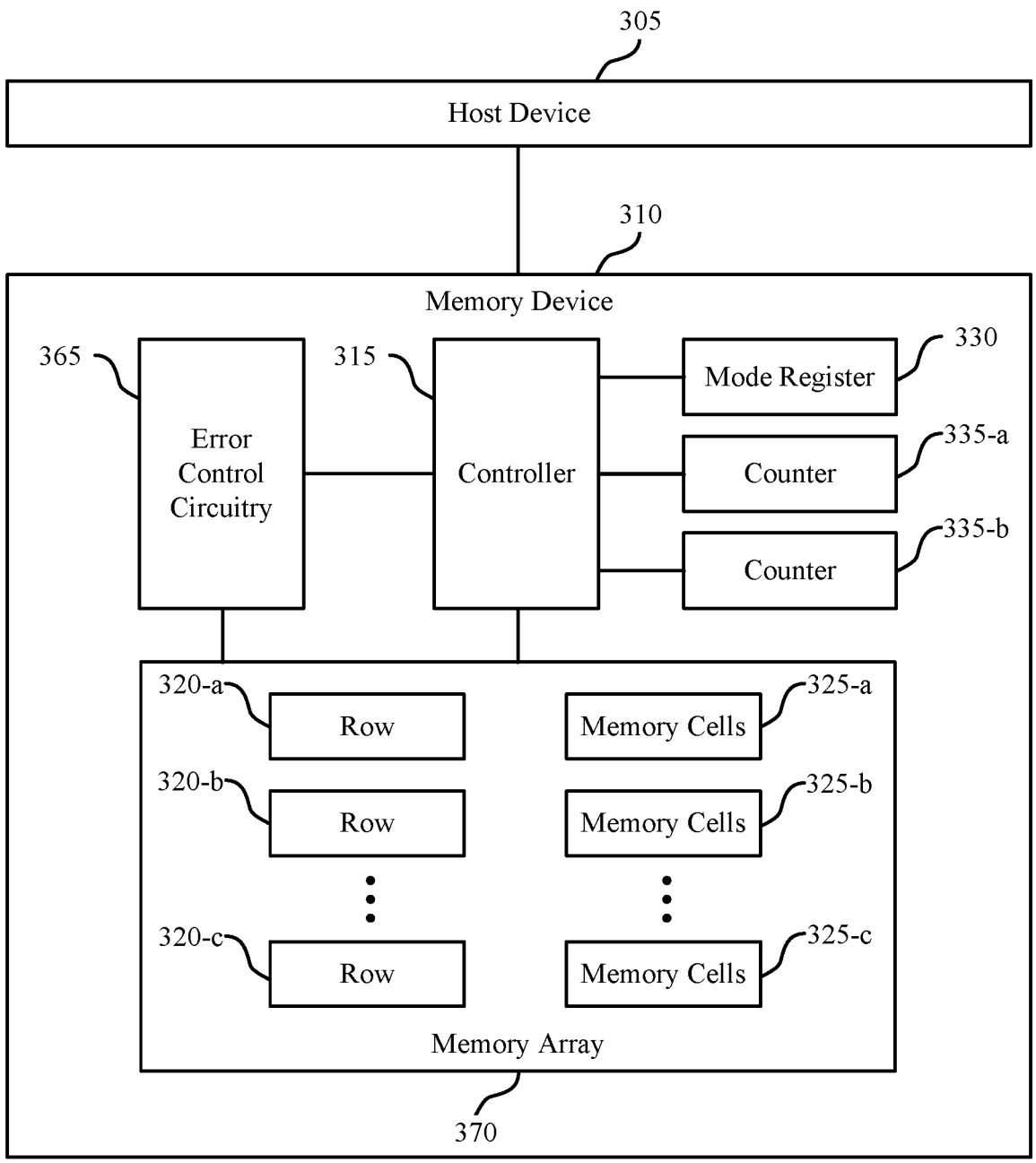
FIG. 3 illustrates an example of a system that supports scrub operations with row error information in accordance with examples as disclosed herein.

FIG. 3 illustrates an example of a system 300 that supports scrub operations with row error information in accordance with examples as disclosed herein. The system 300 may include one or more components described herein with reference to FIGS. 1 and 2, among others. For example, the system 300 may include a host device 305, which may be an example of the host device 105 as described with reference to FIG. 1; a memory device 310, which may be an example of the memory device 110, the memory dice 160, or the memory die 200 as described with reference to FIGS. 1 and 2; a controller 315, which may be an example of the device memory controller 155, one or more local memory controllers 165, or the local memory controller 260 as described with reference to FIGS. 1 and 2, or any combination thereof; a memory array 370, which may be an example of the memory arrays 170 as described with reference to FIG. 1; error control circuitry 365 which may be an example of the local memory controller 260 or the error control circuitry 265 as described with reference to FIG. 2. The memory device 310 may also include a mode register 330 and counters 335.

The memory array 370 may include a set of rows 320, where each row 320 may store one or more codewords. Additionally, the memory array 370 may include memory cells 325 that store information associated with each row 320 of the memory array 370. For example, the memory cells 325-$a$ may store information associated with the row 320-$a$. Additionally, the memory cells 325-$b$ may store information associated with the row 320-$b$. In some cases, the information associated with a row 320 may be row metadata. In some examples, the memory cells 325 associated with a row 320 may include each memory cell in a column of the memory array 370 (e.g., may be associated with a column designated for storing metadata corresponding to a row 320). Additionally, or alternatively, the memory cells 325 associated with a row 320 may include a subset of memory cells in a column of the memory array 370. Here, a column may include the memory cells 325 associated with a row 320 in addition to other memory cells storing other data.

The host device 305 may send commands to memory device 310 including access commands to perform one or more access operations (e.g., a read operation, a write operation, a scrub operation) at the memory array 370. The controller 315 may process the commands and execute the commands on memory array 370. The error control circuitry 365 may perform one or more error detection or correction operations on data associated with the access commands.

During a write operation, the host device 305 may send, to the memory device 310, a write command including data to be written to the memory array 370. The controller 315 may communicate the data to the error control circuitry 365, which may generate error control information based on the data received from controller 315. For example, the error control circuitry 365 may generate parity or Hamming code information based on the data. The error control circuitry 365 may communicate the error control information to the controller 315 to be stored at the memory array 370 with the data. The controller 315 may store the data at the memory array 370 (e.g., at a location within a row 320 indicated by the write command received from the host device 305). The controller 315 may also store the error control information at the memory array 370. In some cases, the error control information may be stored at a same location as the data (e.g., in the same row 320). In some other cases, the error control information may be stored at a different portion of the memory array 370 than the data.

The memory device 310 may be configured to scrub the memory array 370 in order to detect or correct errors within data stored at the memory array 370. When performing a scrub operation, the controller 315 may read data from each of the rows 320 of the memory array 370. The controller 315 may also read error control information (e.g., that is associated with the data) from the memory array 370. The controller 315 may communicate both the data and the error control information to the error control circuitry 365. The error control circuitry 365 may perform an error control operation based on the data to detect or correct errors associated with the data (e.g., due to leakage, parasitic coupling, or EMI). During the error control operation, the error control circuitry 365 may generate error control information based on the data received from the controller 315. The error control circuitry 365 may compare the received error control information with the generated error control information. In the event that the received error control information and the generated error control information do not match, the error control circuitry 365 may detect an error.

In response to the error control circuitry 365 detecting an error in data from a row 320 of the memory array 370, the controller 315 may increment the counter 335-$a$ and the counter 335-$b$. In some cases, the counter 335-$a$ may indicate a quantity of errors detected in a single row 320 during the scrub operation while the counter 335-$b$ may indicate a quantity of errors detected in each of the rows 320 (e.g., in the memory array 370) during the scrub operation. The counter 335-$a$ may be associated with each row of the rows 320 of the memory array 370. Alternatively, each row 320 of the memory array 370 may be associated with a different counter 335-$a$. In either case, the controller 315 may increment the counter 335-$a$ and the counter 335-$b$ in response to each error detected within a row 320 of the memory array 370 during the scrub operation. For example, the controller 315 may increment the counter 335-$a$ and the counter 335-$b$ in response to the error control circuitry 365 detecting a first error in a first codeword stored in the row 320-$a$. Additionally, the controller 315 may increment the counter 335-$a$ and the counter 335-$b$ for each additional error detected by the error control circuitry 365 in each of the remaining codewords stored in the row 320-$a$.

After the error control circuitry 365 performs error control operations on the data stored in a row 320 (e.g., on each codeword stored by a row 320), the controller 315 may store the quantity of errors detected in the data of the row 320 in the memory array 370. For example, the controller 315 may store the quantity indicated by the counter 335-$a$ in the memory array. In some cases, the controller 315 may store the quantity of errors detected in the data of each row 320 according to a granularity (e.g., according to a granularity of one, a granularity of one thousand, a granularity of two thousand, a granularity of four thousand). In an example of storing the quantity of errors detected in the data of each row 320 according to a granularity of four thousand, the controller 315 may store an indication of zero detected errors in a row 320 in cases that less than four thousand errors are detected in the row 320.

The controller 315 may store the quantity of errors detected in a row 320 during a scrub operation in memory cells 325 that are storing information associated with the row 320 (e.g., metadata associated with the row 320). For example, the controller 315 may store the quantity of errors detected in the row 320-$a$ in the memory cells 325-$a$, the quantity of errors detected in the row 320-$b$ in the memory cells 325-$b$, and the quantity of errors detected in the row 320-$c$ in the memory cells 325-$c$. In some cases, to identify a location of the memory cells 325 associated with a row 320, the controller 315 may read a value stored in the mode register 330. For example, the mode register 330 may store a value indicating a location or address of the memory cells 325-$a$, the memory cells 325-$b$, and the memory cells 325-$c$.

The memory cells 325 may store quantities of errors detected in more than one scrub operation. For example, the memory cells 325 may store quantities of errors detected in a row 320 in two or more previous scrub operations. Here, the memory cells 325 may store one or more bits indicating where the two or more quantities of errors are stored in the memory cells 325. For example, in cases that the memory cells 325-a are storing a first quantity of errors detected in the row 320-a during a first scrub operation and a second quantity of errors detected in the row 320-a during a second scrub operation, the memory cells 325-a may store an indication of which of the memory cells 325-a are storing the first quantity of errors and which of the memory cells 325-a are storing the second quantity of errors. Additionally, or alternatively, the memory cells 325 may store an indication of which of the memory cells 325 store a quantity of detected errors in the row 320 during a next scrub operation. For example, the controller 315 may store the quantity of errors detected in a row 320 in a subset of the memory cells 325 indicated by one or more bits stored in the memory cells 325.

The error control circuitry 365 may, in some cases, generate corrected data based on errors detected during the error correction operation. In a case that the error control circuitry 365 generated corrected data, the error control circuitry 365 may further communicate the corrected data to the controller 315. Here, the controller 315 may communicate the corrected data to the memory array 370 to be stored at the memory array 370 (e.g., at a same row 320 as the uncorrected data was previously stored). That is, the controller 315 may write the corrected data to the memory array 370.

Based on storing the quantity of errors detected in one row 320 during the scrub operation, the controller 315 may reset the counter 335-a. Thus, when the controller 315 reads the data and error control information from another row 320 as part of the scrub operation, the counter 335-a may be initialized to indicate no errors detected in that row 320. Additionally, once the controller 315 has performed the scrub operation on each of the rows 320 (e.g., and stored the quantity of errors detected in each of the rows 320), the controller 315 may additionally store the quantity of errors detected in the memory array 370 during the scrub operation (e.g., based on the quantity indicated by the counter 335-b). Then, the controller 315 may reset the counter 335-b. Thus, when the controller 315 initiates another scrub operation at the memory array 370, the counter 335-b may be initialized to indicate no errors detected in the memory array 370.

The controller 315 may identify one or more rows 320 of the memory array associated with a decreased reliability based on the quantities of errors detected in the rows 320 during scrub operations. For example, the controller 315 may determine, based on the quantities of errors detected in a row in a past two or more scrub operations, whether the row 320 is associated with a decreased reliability. In some cases, if the controller 315 identifies that more than a threshold quantity of errors have been detected in a row 320 for more than a threshold quantity of scrub operations (e.g., based on the memory cells 325 storing the quantity of errors detected in that row 320 for a two or more previously-executed scrub operations), the controller 315 may determine that the row 320 is associated with a decreased reliability. Thus, the controller 315 may determine whether a row 320 is associated with a decreased reliability based on the quantity of errors detected in that row 320 in more than one previously-executed scrub operation.

In cases that the controller 315 determines that a row 320 of the memory array 370 is associated with a decreased reliability, the controller 315 may reconfigure the memory array 370 (e.g., by offlining the row 320 associated with the decreased reliability). For example, in a case that the controller 315 determines that the row 320-b is associated with a decreased reliability (e.g., based on the memory cells 325-b storing quantities of errors detected in the row 320-b during two or more scrub operations that exceed a threshold), the controller 315 may store the data of row 320-b in another row 320 of the memory array 370 (e.g., in a redundant row 320 of the memory array 370) that is not associated with the decreased reliability. In such cases, a memory device 310 may include one or more redundant rows configured to replace rows that have decreased reliability. In some cases, reconfiguring the memory array 370 to store data in a row 320 that is not associated with the decreased reliability may improve a reliability of the memory array 370 and, by extension, of the memory device 310.

Figure 4:
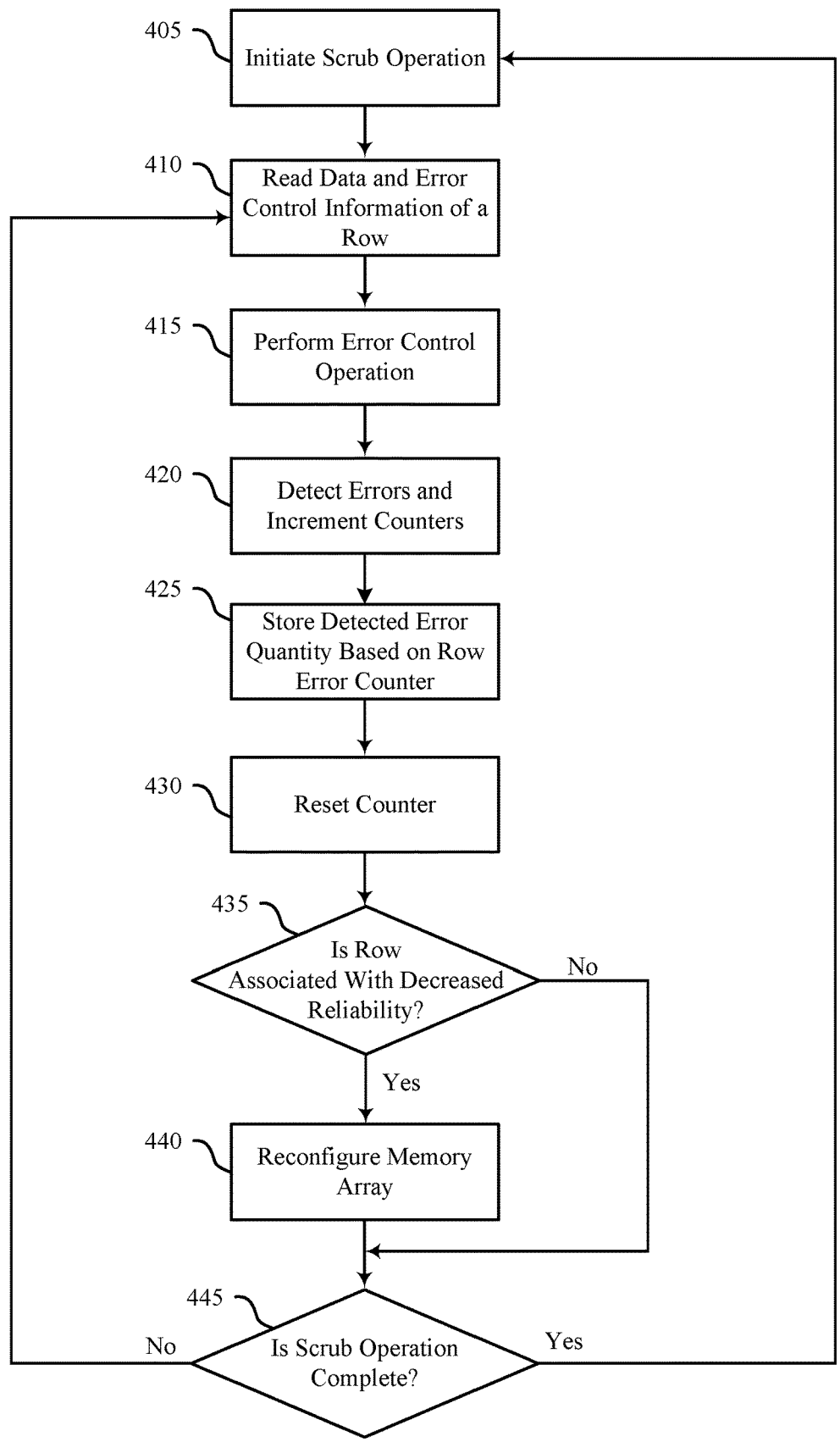
FIG. 4 illustrates an example of a process flow that supports scrub operations with row error information in accordance with examples as disclosed herein.

FIG. 4 illustrates an example of a process flow 400 that supports scrub operations with row error information in accordance with examples as disclosed herein. The process flow 400 may implement aspects of the systems 100 and 300 and memory die 200 described with reference to FIGS. 1 through 3. The process flow 400 may include operations performed by a memory device, which may be an example of the memory device, memory array, or memory die as described herein.

At 405, the memory device 405 may initiate a scrub operation at a memory array. In one example, the memory device 405 may initiate the scrub operation in response to receiving a command from a host device. In another example, the memory device 405 may generate internal commands to perform the scrub operation at the memory array. That is, the memory device 405 may be configured to perform scrub operations of the memory array according to a periodicity (e.g., once a day, once a week, once an hour, or other periodicity). In some cases, the scrub operation may be initiated when the memory device 405 is in idle state or is otherwise performing a reduced quantity of operations received from a host device.

At 410, the memory device may read, as part of the scrub operation initiated at 405, data and error control information stored in a row of the memory array. For example, the memory device may read a set of codewords stored in the row of the memory array and error control information associated with each of the set of codewords. In some cases, the memory device may identify a row of the memory array to read data and error control information from based on a row counter at the memory device (e.g., indicating one of the rows of the memory array).

At 415, the memory device may perform an error control operation on the data stored in the row based on the error control information associated with the data. That is, the memory device may generate error control information based on the data stored in the row and compare the generated error control information with the error control information stored in the memory array. In some cases, as part of the error control operation, the memory device may additionally correct one or more errors in the data. That is, the memory device may generate corrected data based on the data and the error control information as part of the error control operation. Here, the memory device may write the corrected data back to the row of the memory array.

At 420, the memory device may detect a quantity of errors in the data stored in the row and, in response to detecting each error, may increment a first counter associated with errors detected in each row of the memory array. Additionally, the memory device may increment a second counter associated with errors detected in the memory array.

At 425, memory device may store the quantity of errors detected in the row in the memory array (e.g., based on the quantity indicated by the first counter). For example, the memory device may store the quantity of errors in memory cells of the memory array storing metadata associated with the row. In some cases, the memory device may identify a location of the memory cells storing the metadata associated with that row based on a value stored in a mode register at the memory device. Additionally, the memory cells may be storing one or more other quantities of errors detected in the row in one or more previous scrub operations. In some cases, the memory cells may additionally store one or more bits indicating a subset of the memory cells for the memory device to store a next quantity of errors detected in the row. Here, the memory device may store the quantity of errors detected in the row (e.g., at 420) in the indicated subset of the memory cells.

At 430, the memory device may reset the first counter associated with errors detected in each row of the memory array. Additionally, the memory device may increment the row counter at the memory device (e.g., indicating a row for the scrub operation).

At 435, the memory device may determine whether the row is associated with a decreased reliability. For example, the memory device may compare each of the stored quantities of errors detected in the row with a threshold. In cases that a quantity of the quantities of errors exceeds the threshold, the memory device may determine that the row is associated with a decreased reliability. In some cases, a total quantity of errors over a quantity of scrub operations may be compared with a threshold to determine whether the row is associated with a decreased reliability. In some cases, if the quantity of errors satisfies a threshold for a certain quantity scrub operations, the memory device may determine whether the row is associated with a decreased reliability. In some cases, other combinations of quantities of errors over quantities of scrub operations (e.g., average errors over a quantity of scrub operations) may be used to determine whether the row is associated with a decreased reliability. In some cases, if more than the threshold quantity of errors have been detected in the row for more than one scrub operation, the memory device may be more likely to determine that a row is associated with a decreased reliability. Additionally, in cases that the quantity of the errors fails to satisfy the threshold, the memory device may determine that the row is not associated with a decreased reliability. If the memory device determines that the row is associated with the decreased reliability, the memory device may proceed to 440. Additionally, if the memory device determines that the row is not associated with the decreased reliability, the memory device may proceed to 445.

At 435, the memory device may reconfigure the memory array. For example, the memory device my store the data of the row in another row that is associated with a greater reliability. That is, the memory device may offline the row determined to be associated with a decreased reliability and store the data in a redundant row of the memory array.

At 440, the memory device may determine whether the scrub operation is complete. In cases that the scrub operation is complete, the memory device may store the quantity of errors detected in the memory array during the scrub operation (e.g., based on a value of the second counter associated with errors detected in the memory array). Additionally, the memory device may reset the second counter associated with errors detected in the memory array and proceed to 405. In cases that the scrub operation is not complete, the memory device may proceed to 410 to read data and error control information from a next row in the memory array as part of the scrub operation.

Figure 5:
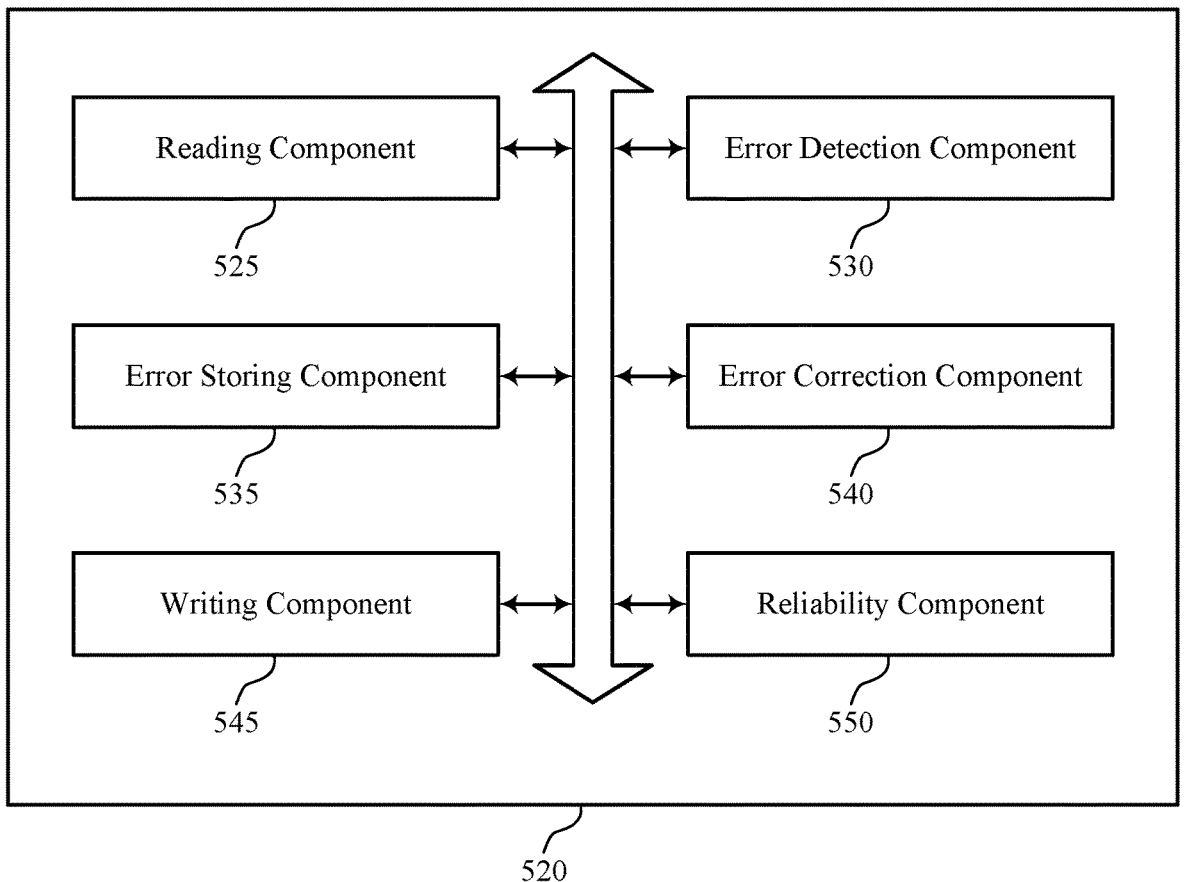
FIG. 5 shows a block diagram of a memory device that supports scrub operations with row error information in accordance with examples as disclosed herein.

FIG. 5 shows a block diagram 500 of a memory device 520 that supports scrub operations with row error information in accordance with examples as disclosed herein. The memory device 520 may be an example of aspects of a memory device as described with reference to FIGS. 1 through 4. The memory device 520, or various components thereof, may be an example of means for performing various aspects of scrub operations with row error information as described herein. For example, the memory device 520 may include a reading component 525, an error detection component 530, an error storing component 535, an error correcting component 540, a writing component 545, a reliability component 550, or any combination thereof. Each of these components may communicate, directly or indirectly, with one another (e.g., via one or more buses).

The reading component 525 may be configured as or otherwise support a means for reading, as part of a scrub operation, data and error control information stored in a row of a plurality of rows of a memory array of a memory device. The error detection component 530 may be configured as or otherwise support a means for detecting, as part of the scrub operation, a quantity of errors in the data of the row based at least in part on reading the data and the error control information. The error storing component 535 may be configured as or otherwise support a means for storing, in memory cells storing information associated with the row, the quantity of errors detected in the data of the row as part of the scrub operation.

In some examples, the error storing component 535 may be configured as or otherwise support a means for storing, in the memory cells storing information associated with the row, a second quantity of errors detected in the data of the row as part of a second scrub operation performed at the memory device prior to performing the scrub operation, where storing the quantity of errors is based at least in part on storing the second quantity of errors.

In some examples, the memory cells storing information associated store the quantity of errors identified by a plurality of scrub operations performed on the row.

In some examples, the error correcting component 540 may be configured as or otherwise support a means for performing, as part of the scrub operation, an error correction operation on the data read from the row to generate second data based at least in part on the error control information. In some examples, the writing component 545 may be configured as or otherwise support a means for writing the second data to the row of the memory array, where storing the quantity of errors detected in the data of the row is based at least in part on the writing.

In some examples, the error detection component 530 may be configured as or otherwise support a means for identifying, based at least in part on the storing, the quantity of errors detected in the data of the row. In some examples, the reliability component 550 may be configured as or otherwise support a means for determining, based at least in part on the identifying, that the row is associated with a decreased reliability based at least in part on the quantity of errors. In some examples, the reliability component 550 may be configured as or otherwise support a means for reconfiguring the memory array to store the data of the row in a second row different from the row and associated with a greater reliability than the row.

In some examples, the reliability component 550 may be configured as or otherwise support a means for identifying, based at least in part on the storing, a second quantity of errors detected in the data of the row as part of a second scrub operation performed at the memory device prior to performing the scrub operation, where determining that the row is associated with the decreased reliability is based at least in part on the second quantity of errors.

In some examples, the error storing component 535 may be configured as or otherwise support a means for reading a value stored in a mode register at the memory device. In some examples, the error storing component 535 may be configured as or otherwise support a means for identifying, from a plurality of memory cells at the memory device, the memory cells storing information associated with the row based at least in part on the value stored in the mode register, where storing the quantity of errors is based at least in part on identifying the memory cells storing information associated with the row.

In some examples, the error detection component 530 may be configured as or otherwise support a means for incrementing a counter associated with the plurality of rows of the memory array in response to detecting each of the quantity of errors in the data of the row, where storing the quantity of errors detected in the row is based at least in part on incrementing the counter. In some examples, the error detection component 530 may be configured as or otherwise support a means for resetting the counter based at least in part on storing the quantity of errors detected in the data of the row.

In some examples, the reading component 525 may be configured as or otherwise support a means for reading, as part of the scrub operation and based at least in part on storing the quantity of errors, second data and second error control information stored in a second row of the plurality of rows. In some examples, the error detection component 530 may be configured as or otherwise support a means for detecting, as part of the scrub operation, a second quantity of errors in the second data of the second row based at least in art on reading the second data and the second error control information. In some examples, the error storing component 535 may be configured as or otherwise support a means for storing, in second memory cells storing information associated with the second row, the second quantity of errors detected in the second data of the second row as part of the scrub operation.

In some examples, the error detection component 530 may be configured as or otherwise support a means for incrementing a counter associated with the memory array in response to detecting each of the quantity of errors in the data of the row. In some examples, the error detection component 530 may be configured as or otherwise support a means for incrementing the counter associated with the memory array in response to detecting each of the second quantity of errors in the second data of the second row. In some examples, the error storing component 535 may be configured as or otherwise support a means for storing, based at least in part on incrementing the counter, a third quantity of errors detected in the data of the memory array as part of the scrub operation and based at least in part on the third quantity of errors being indicated by the counter associated with the memory array.

In some examples, the memory cells storing information associated with the row include memory cells of a column of the row.

Figure 6:
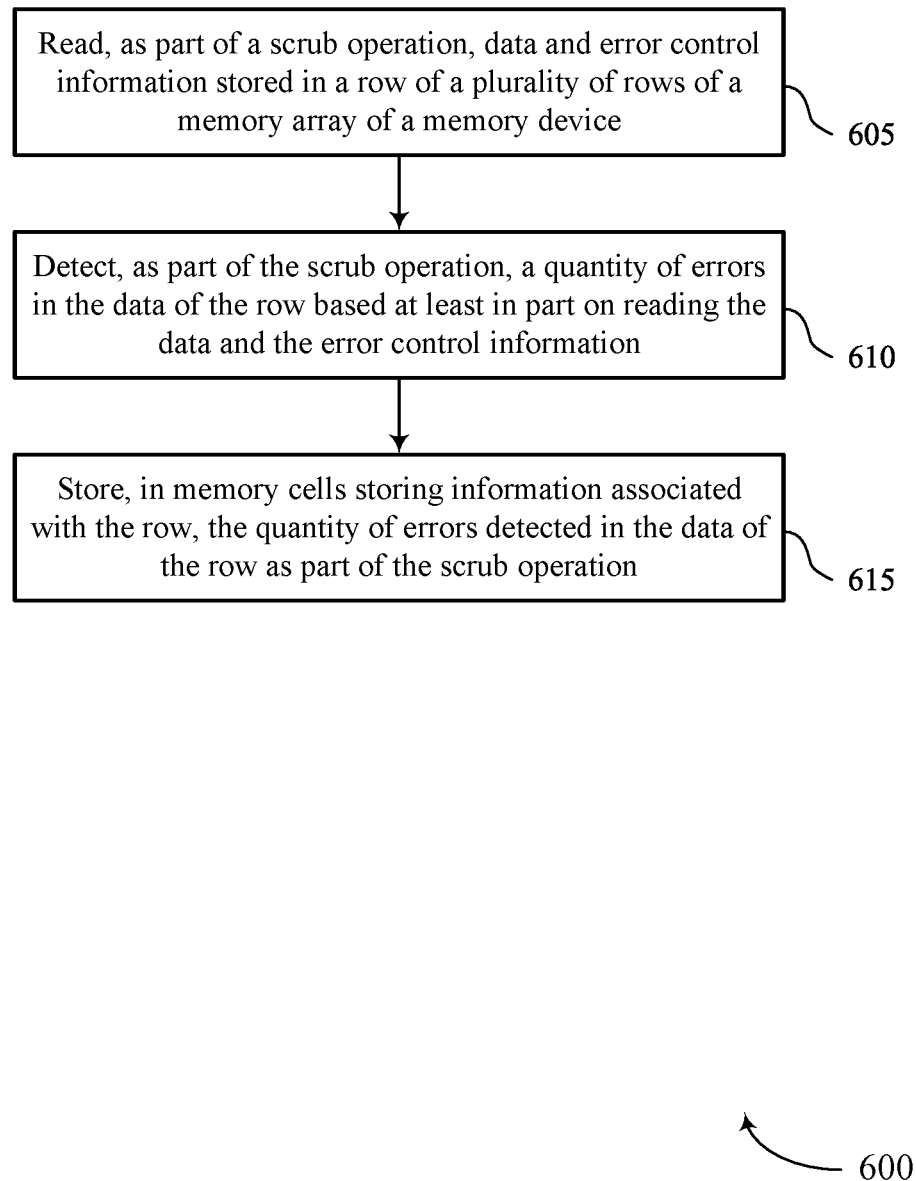
FIG. 6 shows a flowchart illustrating a method or methods that support scrub operations with row error information in accordance with examples as disclosed herein.

FIG. 6 shows a flowchart illustrating a method 600 that supports scrub operations with row error information in accordance with examples as disclosed herein. The operations of method 600 may be implemented by a memory device or its components as described herein. For example, the operations of method 600 may be performed by a memory device as described with reference to FIGS. 1 through 5. In some examples, a memory device may execute a set of instructions to control the functional elements of the device to perform the described functions. Additionally, or alternatively, the memory device may perform aspects of the described functions using special-purpose hardware.

At 605, the method may include reading, as part of a scrub operation, data and error control information stored in a row of a plurality of rows of a memory array of a memory device. The operations of 605 may be performed in accordance with examples as disclosed herein. In some examples, aspects of the operations of 605 may be performed by a reading component 525 as described with reference to FIG. 5.

At 610, the method may include detecting, as part of the scrub operation, a quantity of errors in the data of the row based at least in part on reading the data and the error control information. The operations of 610 may be performed in accordance with examples as disclosed herein. In some examples, aspects of the operations of 610 may be performed by an error detection component 530 as described with reference to FIG. 5.

At 615, the method may include storing, in memory cells storing information associated with the row, the quantity of errors detected in the data of the row as part of the scrub operation. The operations of 615 may be performed in accordance with examples as disclosed herein. In some examples, aspects of the operations of 615 may be performed by an error storing component 535 as described with reference to FIG. 5.

In some examples, an apparatus as described herein may perform a method or methods, such as the method 600. The apparatus may include features, circuitry, logic, means, or instructions (e.g., a non-transitory computer-readable medium storing instructions executable by a processor), or any combination thereof for performing the following aspects of the present disclosure:

Aspect 1: A method, apparatus, or non-transitory computer-readable medium including operations, features, circuitry, logic, means, or instructions, or any combination thereof for reading, as part of a scrub operation, data and error control information stored in a row of a plurality of rows of a memory array of a memory device; detecting, as part of the scrub operation, a quantity of errors in the data of the row based at least in part on reading the data and the error control information; and storing, in memory cells storing information associated with the row, the quantity of errors detected in the data of the row as part of the scrub operation.

Aspect 2: The method, apparatus, or non-transitory computer-readable medium of aspect 1, further including operations, features, circuitry, logic, means, or instructions, or any combination thereof for storing, in the memory cells storing information associated with the row, a second quantity of errors detected in the data of the row as part of a second scrub operation performed at the memory device prior to performing the scrub operation, where storing the quantity of errors is based at least in part on storing the second quantity of errors.

Aspect 3: The method, apparatus, or non-transitory computer-readable medium of any of aspects 1 through 2 where the memory cells storing information associated store the quantity of errors identified by a plurality of scrub operations performed on the row.

Aspect 4: The method, apparatus, or non-transitory computer-readable medium of any of aspects 1 through 3, further including operations, features, circuitry, logic, means, or instructions, or any combination thereof for performing, as part of the scrub operation, an error correction operation on the data read from the row to generate second data based at least in part on the error control information and writing the second data to the row of the memory array, where storing the quantity of errors detected in the data of the row is based at least in part on the writing.

Aspect 5: The method, apparatus, or non-transitory computer-readable medium of any of aspects 1 through 4, further including operations, features, circuitry, logic, means, or instructions, or any combination thereof for identifying, based at least in part on the storing, the quantity of errors detected in the data of the row; determining, based at least in part on the identifying, that the row is associated with a decreased reliability based at least in part on the quantity of errors; and reconfiguring the memory array to store the data of the row in a second row different from the row and associated with a greater reliability than the row.

Aspect 6: The method, apparatus, or non-transitory computer-readable medium of aspect 5, further including operations, features, circuitry, logic, means, or instructions, or any combination thereof for identifying, based at least in part on the storing, a second quantity of errors detected in the data of the row as part of a second scrub operation performed at the memory device prior to performing the scrub operation, where determining that the row is associated with the decreased reliability is based at least in part on the second quantity of errors.

Aspect 7: The method, apparatus, or non-transitory computer-readable medium of any of aspects 1 through 6, further including operations, features, circuitry, logic, means, or instructions, or any combination thereof for reading a value stored in a mode register at the memory device and identifying, from a plurality of memory cells at the memory device, the memory cells storing information associated with the row based at least in part on the value stored in the mode register, where storing the quantity of errors is based at least in part on identifying the memory cells storing information associated with the row.

Aspect 8: The method, apparatus, or non-transitory computer-readable medium of any of aspects 1 through 7, further including operations, features, circuitry, logic, means, or instructions, or any combination thereof for incrementing a counter associated with the plurality of rows of the memory array in response to detecting each of the quantity of errors in the data of the row, where storing the quantity of errors detected in the row is based at least in part on incrementing the counter and resetting the counter based at least in part on storing the quantity of errors detected in the data of the row.

Aspect 9: The method, apparatus, or non-transitory computer-readable medium of any of aspects 1 through 8, further including operations, features, circuitry, logic, means, or instructions, or any combination thereof for reading, as part of the scrub operation and based at least in part on storing the quantity of errors, second data and second error control information stored in a second row of the plurality of rows; detecting, as part of the scrub operation, a second quantity of errors in the second data of the second row based at least in art on reading the second data and the second error control information; and storing, in second memory cells storing information associated with the second row, the second quantity of errors detected in the second data of the second row as part of the scrub operation.

Aspect 10: The method, apparatus, or non-transitory computer-readable medium of aspect 9, further including operations, features, circuitry, logic, means, or instructions, or any combination thereof for incrementing a counter associated with the memory array in response to detecting each of the quantity of errors in the data of the row; incrementing the counter associated with the memory array in response to detecting each of the second quantity of errors in the second data of the second row; and storing, based at least in part on incrementing the counter, a third quantity of errors detected in the data of the memory array as part of the scrub operation and based at least in part on the third quantity of errors being indicated by the counter associated with the memory array.

Aspect 11: The method, apparatus, or non-transitory computer-readable medium of any of aspects 1 through 10 where the memory cells storing information associated with the row include memory cells of a column of the row.

It should be noted that the methods described herein describe possible implementations, and that the operations and the steps may be rearranged or otherwise modified and that other implementations are possible. Further, portions from two or more of the methods may be combined.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (e.g., in conductive contact with, connected with, coupled with) one another if there is any electrical path (e.g., conductive path) between the components that can, at any time, support the flow of signals (e.g., charge, current voltage) between the components. At any given time, a conductive path between components that are in electronic communication with each other (e.g., in conductive contact with, connected with, coupled with) may be an open circuit or a closed circuit based on the operation of the device that includes the connected components. A conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to condition of moving from an open-circuit relationship between components in which signals are not presently capable of being communicated between the components (e.g., over a conductive path) to a closed-circuit relationship between components in which signals are capable of being communicated between components (e.g., over the conductive path). When a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other when the switch is open. When a controller isolates two components, the controller affects a change that prevents signals from flowing between the components using a conductive path that previously permitted signals to flow.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component (e.g., a transistor) discussed herein may represent a field-effect transistor (FET), and may comprise a three-terminal component including a source (e.g., a source terminal), a drain (e.g., a drain terminal), and a gate (e.g., a gate terminal). The terminals may be connected to other electronic components through conductive materials (e.g., metals, alloys). The source and drain may be conductive, and may comprise a doped (e.g., heavily-doped, degenerate) semiconductor region. The source and drain may be separated by a doped (e.g., lightly-doped) semiconductor region or channel. If the channel is n-type (e.g., majority carriers are electrons), then the FET may be referred to as a n-type FET. If the channel is p-type (e.g., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" when a voltage greater than or equal to the transistor's threshold voltage is applied to the transistor gate. The transistor may be "off" or "deactivated" when a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over as one or more instructions (e.g., code) on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and modules described in connection with the disclosure herein may be implemented or performed with a processor, such as a DSP, an ASIC, an FPGA, discrete gate logic, discrete transistor logic, discrete hardware components, other programmable logic device, or any combination thereof designed to perform the functions described herein. A processor may be an example of a microprocessor, a controller, a microcontroller, a state machine, or any type of processor. A processor may also be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a computer, or a processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method, comprising:
   reading, as part of a scrub operation, data and error control information stored in a row of a plurality of rows of a memory array of a memory device;
   detecting, as part of the scrub operation, a quantity of errors in the data of the row based at least in part on reading the data and the error control information; and
   storing, in memory cells storing information associated with the row, a first indication of the quantity of errors detected in the data of the row as part of the scrub operation, wherein the information associated with the row includes a second indication of a second quantity of errors associated with the row from one or more previous scrub operations.

2. The method of claim 1, wherein the memory cells storing information associated store the quantity of errors identified by a plurality of scrub operations performed on the row.

3. The method of claim 1, further comprising:
   performing, as part of the scrub operation, an error correction operation on the data read from the row to generate second data based at least in part on the error control information; and
   writing the second data to the row of the memory array, wherein storing the quantity of errors detected in the data of the row is based at least in part on the writing.

4. The method of claim 1, further comprising:
   identifying, based at least in part on the storing, the quantity of errors detected in the data of the row;
   determining, based at least in part on the identifying, that the row is associated with a decreased reliability based at least in part on the quantity of errors; and
   reconfiguring the memory array to store the data of the row in a second row different from the row and associated with a greater reliability than the row.

5. The method of claim 4, further comprising:
   identifying, based at least in part on the storing, a second quantity of errors detected in the data of the row as part of a second scrub operation performed at the memory device prior to performing the scrub operation, wherein determining that the row is associated with the decreased reliability is based at least in part on the second quantity of errors.

6. The method of claim 1, further comprising:
   reading a value stored in a mode register at the memory device; and
   identifying, from a plurality of memory cells at the memory device, the memory cells storing information associated with the row based at least in part on the value stored in the mode register, wherein storing the quantity of errors is based at least in part on identifying the memory cells storing information associated with the row.

7. The method of claim 1, further comprising:
   incrementing a counter associated with the plurality of rows of the memory array in response to detecting each of the quantity of errors in the data of the row, wherein storing the quantity of errors detected in the row is based at least in part on incrementing the counter; and resetting the counter based at least in part on storing the quantity of errors detected in the data of the row.

8. The method of claim 1, further comprising:
   reading, as part of the scrub operation and based at least in part on storing the quantity of errors, second data and second error control information stored in a second row of the plurality of rows;
   detecting, as part of the scrub operation, a second quantity of errors in the second data of the second row based at least in art on reading the second data and the second error control information; and
   storing, in second memory cells storing information associated with the second row, the second quantity of errors detected in the second data of the second row as part of the scrub operation.

9. The method of claim 8, further comprising:
   incrementing a counter associated with the memory array in response to detecting each of the quantity of errors in the data of the row;
   incrementing the counter associated with the memory array in response to detecting each of the second quantity of errors in the second data of the second row; and
   storing, based at least in part on incrementing the counter, a third quantity of errors detected in the data of the memory array as part of the scrub operation and based at least in part on the third quantity of errors being indicated by the counter associated with the memory array.

10. The method of claim 1, wherein the memory cells storing information associated with the row comprise memory cells of a column of the row.

11. An apparatus, comprising:
    a memory array comprising a plurality of rows; and
    a controller coupled with the memory array and configured to:
      read, as part of a scrub operation, data and error control information stored in a row of the plurality of rows of the memory array of the apparatus;
      detect, as part of the scrub operation, a quantity of errors in the data of the row based at least in part on reading the data and the error control information; and
      store, in memory cells storing information associated with the row, a first indication of the quantity of errors detected in the data of the row as part of the scrub operation, wherein the information associated with the row includes a second indication of a second quantity of errors associated with the row from one or more previous scrub operations.

12. The apparatus of claim 11, wherein the memory cells storing information associated store the quantity of errors identified by a plurality of scrub operations performed on the row.

13. The apparatus of claim 11, wherein the controller is further configured to:
    perform, as part of the scrub operation, an error correction operation on the data read from the row to generate second data based at least in part on the error control information; and
    write the second data to the row of the memory array, wherein storing the quantity of errors detected in the data of the row is based at least in part on the writing.

14. The apparatus of claim 11, wherein the controller is further configured to:
    identify, based at least in part on the storing, the quantity of errors detected in the data of the row;

determine, based at least in part on the identifying, that the row is associated with a decreased reliability based at least in part on the quantity of errors; and reconfigure the memory array to store the data of the row in a second row different from the row and associated with a greater reliability than the row.

15. The apparatus of claim 14, wherein the controller is further configured to:

identify, based at least in part on the storing, a second quantity of errors detected in the data of the row as part of a second scrub operation performed at the apparatus prior to performing the scrub operation, wherein determining that the row is associated with the decreased reliability is based at least in part on the second quantity of errors.

16. The apparatus of claim 11, further comprising:

a mode register coupled with the controller, wherein the controller is further configured to:

read a value stored in the mode register; and identify, from a plurality of memory cells at the apparatus, the memory cells storing information associated with the row based at least in part on the value stored in the mode register, wherein storing the quantity of errors is based at least in part on identifying the memory cells storing information associated with the row.

17. The apparatus of claim 11, further comprising:

a counter associated with the plurality of rows of the memory array and coupled with the controller, wherein the controller is further configured to:

increment the counter in response to detecting each of the quantity of errors in the data of the row, wherein storing the quantity of errors detected in the row is based at least in part on incrementing the counter; and reset the counter based at least in part on storing the quantity of errors detected in the data of the row.

18. The apparatus of claim 11, wherein the controller is further configured to:

read, as part of the scrub operation and based at least in part on storing the quantity of errors, second data and second error control information stored in a second row of the plurality of rows;

detect, as part of the scrub operation, a second quantity of errors in the second data of the second row based at least in art on reading the second data and the second error control information; and store, in second memory cells storing information associated with the second row, the second quantity of errors detected in the second data of the second row as part of the scrub operation.

19. The apparatus of claim 18, further comprising:

a counter associated with the memory array and coupled with the controller, wherein the controller is further configured to:

increment the counter in response to detecting each of the quantity of errors in the data of the row;

increment the counter in response to detecting each of the second quantity of errors in the second data of the second row; and store, based at least in part on incrementing the counter, a third quantity of errors detected in the data of the memory array as part of the scrub operation and based at least in part on the third quantity of errors being indicated by the counter.

20. The apparatus of claim 11, wherein the memory cells storing information associated with the row comprise memory cells of a column of the row.

21. A non-transitory computer-readable medium storing code, the code comprising instructions executable by a processor to:

read, as part of a scrub operation, data and error control information stored in a row of a plurality of rows of a memory array of a memory device;

detect, as part of the scrub operation, a quantity of errors in the data of the row based at least in part on reading the data and the error control information; and store, in memory cells storing information associated with the row, a first indication of the quantity of errors detected in the data of the row as part of the scrub operation, wherein the information associated with the row includes a second indication of a second quantity of errors associated with the row from one or more previous scrub operations.

22. The non-transitory computer-readable medium of claim 21, wherein the memory cells storing information associated store the quantity of errors identified by a plurality of scrub operations performed on the row.

* * * * *